United States Patent
Krishnaswamy (10) Patent No.: US 11,518,871 B2
(45) Date of Patent: Dec. 6, 2022

(54) BLENDS OF POLYOLEFINS WITH FUNCTIONALIZED POLYBUTADIENES

(71) Applicant: BRASKEM AMERICA, INC., Philadelphia, PA (US)

(72) Inventor: Rajendra K. Krishnaswamy, Pittsburgh, PA (US)

(73) Assignee: BRASKEM AMERICA, INC., Philadelphia, PA (US)

( * ) Notice: Subject to any disclaimer, the term of this patent is extended or adjusted under 35 U.S.C. 154(b) by 0 days.

(21) Appl. No.: 16/692,433

(22) Filed: Nov. 22, 2019

(65) Prior Publication Data

US 2020/0165426 A1 May 28, 2020

Related U.S. Application Data

(63) Continuation of application No. 62/772,335, filed on Nov. 28, 2018.

(51) Int. Cl.
*C08L 23/12* (2006.01)
*C08L 23/14* (2006.01)

(52) U.S. Cl.
CPC ............... *C08L 23/12* (2013.01); *C08L 23/14* (2013.01)

(58) Field of Classification Search
CPC ...................................................... C08L 23/12
See application file for complete search history.

(56) References Cited

U.S. PATENT DOCUMENTS

2017/0233565 A1   8/2017   Krishnaswamy

FOREIGN PATENT DOCUMENTS

| CN | 102286167 A | 12/2011 |
| JP | 2003-171508 A | 6/2003 |

*Primary Examiner* — Arrie L Reuther
(74) *Attorney, Agent, or Firm* — Jeffrey N. Townes; Cozen O'Connor (57) ABSTRACT

This invention relates to a polyolefin blend composition comprising a polyolefin base polymer component and a functionalized polybutadiene component. The polyolefin blend exhibits both i) an increased melt flow and ii) an increased impact toughness and/or melt elasticity, as compared to the same composition without the functionalized polybutadiene. This invention also relates to a method of increasing the melt flow of a polyolefin and simultaneously increasing the impact toughness and/or the melt elasticity of the polyolefin by blending a polyolefin base polymer component and a functionalized polybutadiene component.

22 Claims, 4 Drawing Sheets

BLENDS OF POLYOLEFINS WITH FUNCTIONALIZED POLYBUTADIENES

PRIORITY CLAIM

This application claims priority, under 35 U.S.C. § 119(e), to U.S. Provisional Application No. 62/772,335, filed Nov. 28, 2018, hereby incorporated by reference in its entirety.

FIELD OF THE INVENTION

This invention relates to a polyolefin blend composition comprising a polyolefin base polymer component and a functionalized polybutadiene component.

BACKGROUND OF THE INVENTION

Polyolefins such as polypropylenes have gained wide commercial acceptance and usage in numerous applications because of the relatively low cost of the polymers and the desirable properties they exhibit. For instance, polypropylene has been used extensively in automotive and packaging industries. For these applications, it is desirable to increase the melt flow (decrease the viscosity) of the polypropylene so that it can fill the plastic mold more easily during the injection or blow-molding production process.

To increase the melt flow of polypropylene, certain additives, such as an organic peroxide, can be added during compounding. However, as the melt flow increases (lowering the molecular weight), some physical properties, like impact toughness, will typically decrease.

This can be offset to some degree, by adding a traditional impact modifier such as ENGAGE™ 7467 and Vistamaxx™ 6202fl, which can increase the impact strength of the polymer. However, adding the impact modifier then decreases the melt flow of the polymer.

There thus remains a need in the art to develop a polyolefin composition that has a high melt flow while maintaining the impact toughness.

SUMMARY OF THE INVENTION

One aspect of the invention relates to a polyolefin blend composition comprising: about 50 to about 99.5 wt % of a polyolefin base polymer; about 0.5 to about 50 wt % of a polybutadiene functionalized with one or more functional groups selected from the group consisting of hydroxyl, amine, epoxy, vinyl, carboxyl, acrylate or methacrylate, and combinations thereof; and about 0 to about 5 wt % of an organic peroxide.

Another aspect of the invention relates to a polyolefin blend composition comprising: a polyolefin base polymer; and a polybutadiene functionalized with one or more functional groups selected from the group consisting of hydroxyl, amine, epoxy, vinyl, carboxyl, acrylate or methacrylate, and combinations thereof. The composition exhibits both i) an increased melt flow and ii) an increased impact toughness and/or melt elasticity, as compared to the same composition without the functionalized polybutadiene.

Another aspect of the invention relates to a method of increasing the melt flow of a polyolefin and simultaneously increasing the impact toughness and/or the melt elasticity of the polyolefin. The method comprises blending about 50 to about 99.5 wt % of a polyolefin base polymer; about 0.5 to about 50 wt % of a polybutadiene functionalized with one or more functional groups selected from the group consisting of hydroxyl, amine, epoxy, vinyl, carboxyl, acrylate or methacrylate, and combinations thereof and about 0 to about 5 wt % of an organic peroxide to produce a blended polyolefin composition.

Additional aspects, advantages and features of the invention are set forth in this specification, and in part will become apparent to those skilled in the art on examination of the following, or may be learned by practice of the invention. The inventions disclosed in this application are not limited to any particular set of or combination of aspects, advantages and features. It is contemplated that various combinations of the stated aspects, advantages and features make up the inventions disclosed in this application.

DETAILED DESCRIPTION OF THE INVENTION

One aspect of the invention relates to a polyolefin blend composition comprising: about 50 to about 99.5 wt % of a polyolefin base polymer; about 0.5 to about 50 wt % of a polybutadiene functionalized with one or more functional groups selected from the group consisting of hydroxyl, amine, epoxy, vinyl, carboxyl, acrylate or methacrylate, and combinations thereof; and about 0 to about 5 wt % of an organic peroxide.

Another aspect of the invention relates to a polyolefin blend composition comprising: a polyolefin base polymer; and a polybutadiene functionalized with one or more functional groups selected from the group consisting of hydroxyl, amine, epoxy, vinyl, carboxyl, acrylate or methacrylate, and combinations thereof. The composition exhibits both i) an increased melt flow and ii) an increased impact toughness and/or melt elasticity, as compared to the same composition without the functionalized polybutadiene. The term "as compared to the same composition without the functionalized polybutadiene" means that the composition to be compared to has all the same components, except that the functionalized polybutadiene is not present, as shown in the Examples.

The term "polyolefin" generally embraces a homopolymer prepared from a single type of olefin monomer as well as a copolymer prepared from two or more olefin monomers. A specific polyolefin referred to herein shall mean polymers comprising greater than 50% by weight of units derived from that specific olefin monomer, including homopolymers of that specific olefin or copolymers containing units derived from that specific olefin monomer and one or more other types of olefin comonomers. For instance, polypropylene shall mean polymers comprising greater than 50 wt % of units derived from propylene monomer, including polypropylene homopolymers or copolymers containing units derived from propylene monomer and one or more other types of olefin comonomers. The polyolefin used herein can be a copolymer wherein the comonomer(s) is/are randomly (or statistically) distributed along the polymer chain, a periodic copolymer, an alternating copolymer, or a block copolymer comprising two or more homopolymer blocks linked by covalent bonds.

Suitable polyolefin base polymers include those prepared from linear, branched, or cyclo olefin monomers having 2 to 20 carbon atoms, 2 to 16 carbon atoms, or 2 to 12 carbon atoms. Exemplary olefin monomers are α-olefins including but not limited to ethylene, propylene, 1-butene, 2-butene, 1-pentene, 3-methyl-1-butene, 1-hexene, 4-methyl-1-pentene, 3-methyl-1-pentene, 4,6-dimethyl-1-heptene, 1-octene, 1-decene, 1-undecene, 1-dodecene, 1-tetradecene, 1-hexadecene, 1-octadecene, 1-eicocene, and combinations thereof. These olefins may each contain a heteroatom such as an oxygen, nitrogen, or silicon atom.

As discussed above, suitable polyolefin base polymers include not only a homopolymer prepared from a single type of olefin monomer, but also a copolymer prepared from two or more olefin comonomers. Suitable comonomers that form a polyolefin copolymer for the polyolefin base polymer also include polyene comonomers (having 3 to 20 carbon atoms including but not limited to butadiene, isoprene, pentadiene, dimethylbutadiene, dimethylpentadiene, hexadiene, methylhexadiene, dimethylhexadiene, octadiene, 4-vinyl cyclohexene, and dicyclopentadiene), vinyl comonomers (including but not limited to acrylonitrile and acrylamide, and their derivatives), and vinylaromatic comonomers (including but not limited to styrene and its derivatives, such as α-methyl styrene); any of which may each contain a heteroatom such as an oxygen, nitrogen, or silicon atom. Additional exemplary comonomers include but are not limited to 1,3-butadiene; 1,3-pentadiene, 1,4-pentadiene; 3-methyl-1,4-pentadiene; 3,3-dimethyl-1,4-pentadiene; 1,3-hexadiene; 1,4-hexadiene; 1,5-hexadiene; 3-methyl-1,5-hexadiene; 3,4-dimethyl-1,5-hexadiene; 1,3-heptadiene; 1,4-heptadiene; 1,5-heptadiene; 1,6-heptadiene; 1,3-octadiene; 1,4-octadiene; 1,5-octadiene; 1,6-octadiene; 1,7-octadiene; and combinations thereof.

Typical polyolefin base polymers include polyethylene homopolymer, polypropylene homopolymer, a copolymer of propylene and one or more other olefin comonomers (such as a random polypropylene copolymer comprising a second olefin comonomer, a heterophasic polypropylene impact copolymer comprising a second olefin comonomer), and a polymer blend containing polyethylene, polypropylene, and/or a copolymer of polyethylene and polypropylene. For example, the polyolefin base polymer is a polypropylene homopolymer. In another example, the polyolefin base polymer is a polyethylene homopolymer.

The polyolefin base polymer can also be an impact copolymer, i.e., a heterophasic polyolefin copolymer where one polyolefin is the continuous phase and an elastomeric phase is uniformly dispersed therein. This would include, for instance, a heterophasic polypropylene copolymer where polypropylene is the continuous phase and an elastomeric phase is uniformly distributed therein. For instance, a heterophasic polypropylene copolymer where polypropylene is the continuous phase and an ethylene-propylene copolymer (EPR) is dispersed therein. The impact copolymer typically results from an in-reactor process rather than physical blending. A polypropylene impact copolymer may contain an ethylene comonomer at the amount of at least 5 wt %, or at least 10 wt %; and up to 40 wt %, up to 35 wt %, up to 25 wt %, up to 20 wt %, or up to 15 wt %. Examples of some suitable impact polypropylene copolymers may be found in U.S. Pat. No. 6,593,005, which is incorporated herein by reference in its entirety.

The polyolefin base polymer can also be a polymer blend containing ethylene propylene rubber (EPR). The term "blend" or "polymer blend" generally refers to a mixture of two or more polymers. Such a blend may or may not be miscible, and may or may not be phase separated. A polymer blend may or may not contain one or more domain configurations, as determined from transmission electron spectroscopy, light scattering, x-ray scattering, or other methods known in the art.

Suitable polyolefin base polymers typically have a number average molecular weight of greater than 5,000 g/mol, greater than 10,000 g/mol, greater than 20,000 g/mol, greater than 30,000 g/mol, greater than 40,000 g/mol, greater than 50,000 g/mol, or greater than 100,000 g/mol.

Depending on the amount of the functionalized polybutadiene and the amount(s) of other additive(s) contained in the polyolefin blend composition, the amount of the polyolefin base polymer can range from about 50 to about 99.5 wt %, from about 60 to about 99.5 wt %, from about 70 to about 99 wt %, from about 80 to about 99 wt %, from about 90 to about 98 wt %, or from about 90 to about 97 wt %.

The functionalized polybutadiene component is a polybutadiene functionalized with one or more functional groups selected from the group consisting of hydroxyl, amine, epoxy, vinyl, carboxyl, acrylate or methacrylate, and combinations thereof.

The functionalized polybutadiene may be based on a polybutadiene that broadly includes any polymer or copolymer formed from the polymerization of the monomer butadiene, optionally with one or more comonomers. Polymerization of butadiene itself may result in different types of polybutadiene polymers, depending on the different polymerization mechanisms (e.g., by 1,4-polymerization which connects 1,3-butadiene monomers end to end; or by 1,2-polymerization). An exemplary butadiene polymer has a formula of in which $x1+x2+x3=1$. Polybutadiene may also broadly include butadiene monomers copolymerized with other types of comonomers, such as other olefin comonomers, polyene comonomers, vinyl comonomers, or vinylaromatic comonomers. Suitable olefin comonomers, polyene comonomers, vinyl comonomers, and vinylaromatic comonomers, and their exemplary embodiments are those described supra. Exemplary polybutadienes are butadiene polymer, butadiene-acrylonitrile copolymer, butadiene styrene copolymer, acrylonitrile butadiene styrene copolymer, or combinations thereof.

Polybutadiene may be functionalized with one or more functional groups selected from the group consisting of hydroxyl (—OH), carboxyl (—COOH), amine, epoxy, vinyl, acrylate or methacrylate, and combinations thereof, to obtain the functionalized polybutadiene. For example, the functionalized polybutadiene may be a hydroxyl-functionalized polybutadiene, such as a polybutadiene polyol. In another example, the functionalized polybutadiene may be a carboxyl-functionalized polybutadiene.

Any amine-functionalized polybutadiene known to one skilled in the art is suitable to be used herein. Exemplary amine functional groups include a primary, secondary, or tertiary amine wherein one or more hydrogens on the nitrogen may be substituted by a substituted or unsubstituted alkyl or aryl (e.g., n-aminoethylpiperazine); a polyamine (e.g., a diamine such as 2-methylpentamethylenediamine); and wherein R and R' may be independently H, substituted or unsubstituted alkyl or aryl

(e.g.,  or

Any epoxy-functionalized polybutadiene known to one skilled in the art is suitable to be used herein. Exemplary epoxy functional groups include epoxide, di-epoxide wherein R may be alkyl or aryl.

Any acrylate or methacrylate-functionalized polybutadiene known to one skilled in the art is suitable to be used herein. Exemplary acrylate or methacrylate functional groups include acrylate and methacrylate, and their combination with an epoxide or glycidyl group (e.g., ), or These acrylate or methacrylate-functionalized polybutadienes can also be considered vinyl-functionalized polybutadienes.

The functional group(s) may be at the terminal end(s) of the main polymer chain of polybutadiene. Alternatively, the functional group(s) may be attached to one or more repeating units of the polybutadiene as pendent groups. Alternatively, some functional group(s) may be at the terminal end(s) of the main polymer chain, and some functional group(s) may be attached to one or more repeating units of the polybutadiene as pendent groups.

The functionalized polybutadiene may contain one or more same or different functional groups, and the same or different functional groups may be at the terminal end(s) of the main polymer chain of polybutadiene and/or be attached to one or more repeating units of the polybutadiene as pendent groups. For instance, a hydroxyl-functionalized polybutadiene, polybutadiene polyol, may contain pendent (or side-chain) or terminal vinyl (or allyl) functionality in addition to the terminal and/or pendent hydroxyl functionality. This vinyl functionality may be already included as pendent groups in the butadiene polymer due to the 1,2-polymerization of the butadiene monomers; or it may be included as terminal group(s) by a separate functionalization of polybutadiene, as discussed supra. As another example, a carboxyl-functionalized polybutadiene may contain pendent (or side-chain) and/or terminal carboxyl functionality.

The functionalized polybutadiene may contain an average functionality ranging from about 1 to about 5, from about 1.5 to about 4, from about 1.5 to about 3, or from about 2 to about 3.

In one embodiment, the functionalized polybutadiene is a liquid polymer at room temperature.

The functionalized polybutadiene may also be obtained through commercially available sources. For instance, the Hypro™ series of liquid polymers (CVC Thermoset Specialties, NJ) that are based on butadiene polymers or butadiene-acrylonitrile copolymers (having about 0-26% acrylonitrile content to affect the solubility and glass transition temperature of the polymer) are liquid polymers at room temperature, and have functionality groups (such as OH, COOH, NH or $NH_2$, methacrylate, or epoxy) at the chain ends and/or as pendent groups.

The amount of the functionalized polybutadiene used in the polyolefin blend composition depends on the desired melt flow and physical properties, such as impact toughness and/or melt elasticity, to be reached. For instance, the amount of the functionalized polybutadiene can range from about 0.5 to about 50 wt %, from about 0.5 to about 40 wt %, from about 1 to about 30 wt %, from about 1 to about 20 wt %, from about 2 to about 10 wt %, or from about 3 to about 10 wt %.

The polyolefin blend composition may contain one or more additives, such as peroxides (e.g., to increase the melt flow) and/or impact modifiers (e.g., to improve impact toughness).

Suitable organic peroxides include but are not limited to di(4tert-butylcyclohexyl) peroxydicarbonate; di(tert-butylperoxyisopropyl)benzene; di(tert-butylperoxyisopropyl)benzene; di(4-methylbenzoyl) peroxide; dicetyl peroxydicarbonate; dimyristyl peroxydicarbonate; dicumyl peroxide; di-tert-butyl peroxide; dibenzoyl peroxide; diisopropyl peroxydicarbonate; tert-butyl monoperoxymaleate; didecanoyl peroxide; dioctanoyl peroxide; 2,5-dimethyl-2,5-di(tert-butylperoxy) hexane; 2,5-dimethyl-2,5-di-(t-butylperoxy) hexyne-3, tert-butyl hydroperoxide; 3,6,6,9,9-pentamethyl-3-(ethyl acetate)-1,2,4,5-tetraoxy cyclononane; tert-butylperoxy-2-ethylhexyl carbonate; tert-amyl peroxy-2-ethylhexanoate; tert-amyl peroxyneodecanoate; tert-amyl peroxypivalate; tert-amyl peroxybenzoate; tert-amyl peroxyacetate; di-sec-butyl peroxydicarbonate; di(2-ethylhexyl) peroxydicarbonate; tert-butyl cumyl peroxide; and combinations thereof.

The amount of organic peroxide, if used in the polyolefin blend composition, can range from about 0.001 to about 10 wt %, for instance, from about 0.001 to about 5 wt %, from about 0.005 to about 1 wt %, from about 0.01 to about 0.5 wt %, or from about 0.015 wt % to about 0.05 wt %.

In certain embodiments, the polyolefin blend composition has an increased melt flow without using an organic peroxide. In certain embodiments, the polyolefin blend composition has both i) an increased melt flow and ii) an increased impact toughness and/or melt elasticity, as compared to the same composition without the functionalized polybutadiene, while not using an organic peroxide.

Suitable impact modifiers can include a copolymer or terpolymer of propylene and/or ethylene and, optionally, one or more unsaturated comonomers, e.g., α-olefins, C4-20 dienes, vinyl aromatic compounds (e.g., styrene), etc. Exemplary impact modifiers are ethylene butene copolymers and propylene ethylene copolymers.

The amount of impact modifiers, if used in the polyolefin blend composition, can range from about 0.5 to about 20 wt %, from about 0.5 to about 10 wt %, or from about 1 to about 10 wt.

In certain embodiments, the polyolefin blend composition has an increased impact toughness without using an impact modifier. In certain embodiments, the polyolefin blend composition has both i) an increased melt flow and ii) an increased impact toughness and/or melt elasticity, as compared to the same composition without the functionalized polybutadiene, while not using an impact modifier.

A variety of conventional additives may also be included in the polyolefin blend composition, including but not limited to thermal stabilizers, mineral fillers, ultraviolet stabilizers, antioxidants, foaming agents, waxes, flame retardants, dispersants, antistatic agents, lubricants, extender or process oils, nucleating agents, plasticizers, colorants, mold release agents, pigments, and combinations thereof.

The polyolefin blend composition discussed above exhibits superior properties. The melt flow index of a polymer is generally inversely proportional to its molecular weight (although this relationship is not linear). Also, polymers having a higher melt flow generally have a lower viscosity. Typically, an improvement in impact strength is observed in a lower melt flow index polyolefin as compared to a higher melt flow index polyolefin. Therefore, a modification in a polyolefin composition that increases melt flow is typically accompanied by a decrease in impact strength, and vice versa. However, in this invention, the inventors have surprisingly discovered that the polyolefin blend composition exhibits both i) an increased melt flow and ii) an increased impact toughness and/or melt elasticity, as compared to the same composition without the functionalized polybutadiene.

In certain embodiments, the functionalized polybutadiene in the polyolefin blend composition is a hydroxyl-functionalized polybutadiene. The polyolefin blend composition can exhibit a comparable or an increased melt flow index of about 1% or more, about 3% or more, about 5% or more, about 10% or more, about 15% or more, about 20% or more, about 25% or more, about 30% or more, about 35% or more, about 40% or more, about 45% or more, about 50% or more, about 55% or more, about 60% or more, about 65% or more, about 70% or more, about 75% or more, about 80% or more, about 85% or more, about 90% or more, about 95% or more, about 100% or more, about 110% or more, about 120% or more, about 130% or more, about 140% or more, or about 150% or more, measured in accordance with ASTM D1238, as compared to the same composition without the functionalized polybutadiene. With the comparable or increased melt flow index, the same polyolefin blend composition may also exhibit a comparable or an increased impact toughness of about 1% or more, about 3% or more, about 5% or more, about 8% or more, about 10% or more, about 15% or more, about 20% or more, about 25% or more, about 30% or more, about 35% or more, about 40% or more, measured by Izod impact at room temperature in accordance with ASTM D256. With the comparable or increased melt flow index, the same polyolefin blend composition may also exhibit a comparable or an increased melt elasticity of about 5% or more, about 15% or more, about 25% or more, about 35% or more, about 45% or more, about 55% or more, about 65% or more, about 75% or more, about 85% or more, about 95% or more, about 100% or more, about 150% or more, about 160% or more, about 200% or more, about 220% or more, or about 250% or more, measured by G' at 0.1 rad/s.

In one embodiment, the functionalized polybutadiene in the polyolefin blend composition is a hydroxyl-functionalized polybutadiene. The polyolefin blend composition can exhibit an increased melt flow index of about 10% or more, about 20% or more, or about 30% or more, measured in accordance with ASTM D1238; and an increased impact toughness of about 25% or more, about 33% or more, or about 40% or more, measured by Izod impact at room temperature in accordance with ASTM D256.

In one embodiment, the functionalized polybutadiene in the polyolefin blend composition is a hydroxyl-functionalized polybutadiene. The polyolefin blend composition can exhibit an increased melt flow index of about 5% or more, about 25% or more, or about 70% or more, measured in accordance with ASTM D1238; and an increased impact toughness of about 5% or more, or about 8% or more, measured by Izod impact at room temperature in accordance with ASTM D256.

In one embodiment, the functionalized polybutadiene in the polyolefin blend composition is a hydroxyl-functionalized polybutadiene. The polyolefin blend composition can exhibit an increased melt flow index of about 15% or more, about 45% or more, about 75% or more, measured in accordance with ASTM D1238; and an increased melt elasticity of about 100% or more, about 160% or more, or about 220% or more, measured by G' at 0.1 rad/s.

In one embodiment, the functionalized polybutadiene in the polyolefin blend composition is a hydroxyl-functionalized polybutadiene. The polyolefin blend composition further comprises an organic peroxide. The polyolefin blend composition can exhibit an increased melt flow index of about 25% or more, measured in accordance with ASTM D1238, and an increased impact toughness of about 10% or more, measured by Izod impact at 0° C. in accordance with ASTM D256.

In one embodiment, the functionalized polybutadiene in the polyolefin blend composition is a hydroxyl-functionalized polybutadiene. The polyolefin blend composition further comprises an organic peroxide. The polyolefin blend composition can exhibit an increased melt flow index of about 25% or more, measured in accordance with ASTM D1238, and an increased melt elasticity of about 400% or more, measured by G' at 0.1 rad/s.

In certain embodiments, the functionalized polybutadiene in the polyolefin blend composition is a carboxyl-functionalized polybutadiene. The polyolefin blend composition can exhibit a comparable or an increased melt flow index of about 1% or more, about 3% or more, about 5% or more, about 10% or more, about 15% or more, about 20% or more, about 25% or more, about 30% or more, about 35% or more, about 40% or more, about 45% or more, about 50% or more, about 55% or more, about 60% or more, about 65% or more, about 70% or more, about 75% or more, about 80% or more, about 85% or more, about 90% or more, about 95% or more, about 100% or more, about 110% or more, about 120% or more, about 130% or more, about 140% or more, or about 150% or more, measured in accordance with ASTM D1238, as compared to the same composition without the functionalized polybutadiene. With the comparable or increased melt flow index, the same polyolefin blend composition may also exhibit a comparable impact toughness, measured by Izod impact at −30° C. in accordance with ASTM D256. With the comparable or increased melt flow index, the same polyolefin blend composition may also exhibit a comparable or an increased melt elasticity of about 5% or more, about 15% or more, about 25% or more, about 35% or more, about 45% or more, about 55% or more, about 65% or more, about 75% or more, about 85% or more, about 95% or more, about 100% or more, about 150% or more, about 160% or more, or about 200% or more, measured by G' at 0.1 rad/s.

In one embodiment, the functionalized polybutadiene in the polyolefin blend composition is carboxyl-functionalized polybutadiene. The polyolefin blend composition further comprises an organic peroxide. The polyolefin blend composition can exhibit a comparable melt flow index, an increased melt flow index of about 35% or more, or about 130% or more, measured in accordance with ASTM D1238; and an increased melt elasticity of about 35% or more, about 75% or more, or about 160% or more, measured by G' at 0.1 rad/s.

Accordingly, one aspect of the invention also relates to a wide variety of molding products formed from the polyolefin blend composition described supra. Such molding products can be built, shaped, molded and cured by various methods known to one skilled in the art.

All above descriptions and all embodiments in the context of the polyolefin blend composition are applicable to this aspect of the invention relating to a molding product.

Suitable molding products include, but are not limited to, a footwear product, an automotive product (e.g., interior automotive components, such as instrument panel skins and door panel skins), a packaging material, a furniture product, a building material (e.g., roofing membranes and thermal and sound insulation), a textile product (e.g., nonwoven fabrics and fibers), a sports/recreation product, or a consumer electronic product.

Another aspect of the invention relates to a method of increasing the melt flow of a polyolefin and simultaneously increasing the impact toughness and/or the melt elasticity of the polyolefin. The method comprises blending about 50 to about 99.5 wt % of a polyolefin base polymer; about 0.5 to about 50 wt % of a polybutadiene functionalized with one or more functional groups selected from the group consisting of hydroxyl, amine, epoxy, vinyl, carboxyl, acrylate or methacrylate, and combinations thereof; and about 0 to about 5 wt % of an organic peroxide to produce a blended polyolefin composition.

All above descriptions and all embodiments relating to the polyolefin base polymer and functionalized polybutadiene discussed in the above aspects relating to the polyolefin blend composition are applicable to this aspect of the invention relating to a method of increasing the melt flow of a polyolefin and simultaneously increasing the impact toughness and/or the melt elasticity of the polyolefin.

In certain embodiments, the method does not involve adding an organic peroxide to the blended polyolefin composition. In other embodiments, an organic peroxide is blended to the blended polyolefin composition.

In certain embodiments, the method does not involve adding an impact modifier to the blended polyolefin composition. In other embodiments, the method further comprising adding an impact modifier.

In certain embodiments, the method further comprising adding one or more additives.

All above descriptions and all embodiments relating to the various additives include organic peroxide, impact modifiers, and other conventional additives discussed in the above aspects relating to the polyolefin blend composition are applicable to this aspect of the invention relating to a method of increasing the melt flow of a polyolefin and simultaneously increasing the impact toughness and/or the melt elasticity of the polyolefin.

EXAMPLES

The following examples are for illustrative purposes only and are not intended to limit, in any way, the scope of the present invention.

Example 1—Preparation of Exemplary Polyolefin Blend Compositions Materials

Polypropylene homopolymer or copolymer was used as the polyolefin base polymer in the examples. Various grades of polypropylene were used, including a polypropylene impact copolymer TI8300C (Braskem, Brazil), a high crystallinity polypropylene copolymer TI2350C (Braskem, Brazil), and a polypropylene homopolymer F2700HC (Braskem, Brazil).

In various tests below, an organic peroxide, Trigonox® 101 (AkzoNobel, Netherlands), was used in certain polyolefin blend compositions.

An exemplary functionalized polybutadiene used in various tests below was Hypro™ 2800X95 HTB (CVC Thermoset Specialties, NJ), a hydroxyl functional liquid polybutadiene having a hydroxyl functionality of about 2.5 (2.4-2.6), a molecular weight (Mn) of about 2800 g/mol, and a viscosity of 5 Pa·s at room temperature. Another exemplary functionalized polybutadiene used in various tests below was Hypro™ 1300X9 CTBNX (CVC Thermoset Specialties, NJ), a carboxyl functional liquid butadiene-acrylonitrile copolymer, having an acrylonitrile content of about 18%, a carboxyl functionality of about 2.4, a molecular weight (Mn) of about 3600 g/mol, and a viscosity of 160 Pa·s at 27° C.

Also used in the comparative tests below were certain impact modifiers for impact modifications. One impact modifier used was a polyolefin elastomer ENGAGE™ 7467 (Dow Chemical Company, MI), an ethylene butene copolymer having a density of about 0.86 g/cm$^3$ and a melt index at 190° C./2.16 kg of about 1.2 dg/min. Another impact modifier used was polyolefin elastomer Vistamaxx™ 6202fl (ExxonMobil, TX), a propylene ethylene copolymer having a density of about 0.86 g/cm$^3$ and a melt index at 190° C./2.16 kg of about 20 dg/min.

Twin-Screw Extrusion/Compounding

The melt blending, extrusion, and compounding of the components to prepare the polyolefin blend compositions were accomplished using a 21 mm Theyshon® co-rotating twin-screw extruder (Theyshon Group, Austria) using the following temperature profile on a six-zone extruder: 230/230/230/200/200/200 (° C.). All samples were produced at a rate of 20 lbs/hour and a screw speed of 300 rpm. The hopper of the extruder feeding system was flushed continuously with nitrogen gas.

For the polypropylene component preparation, the solid polypropylene pellets were fed into the hopper of the extruder feeding system using a gravimetric feeder.

For the organic peroxide component preparation, the Trigonox® 101 peroxide was introduced in the form of a solid masterbatch, designated as T101-MB: a physical blend of polypropylene powder/mineral oil/Trigonox® 101 in a weight percentage ratio of 89/10.5/0.5 (i.e., the weight percentage of Trigonox® 101 peroxide in this T101-MB masterbatch was 0.5 wt %) was used. A Henschel blender (Zeppelin Systems GmbH, Germany) was used for this mixing: the mineral oil and Trigonox® 101 were blended first into a liquid mix, which was then blended with the polypropylene powder. A one weight percent addition of this T101-MB masterbatch into a polymer represents a presence of 50 ppm of the peroxide in the polymer composition. This T101-MB masterbatch was also fed as a solid into the hopper of the extruder feeding system using a gravimetric feeder.

For the functionalized polybutadiene component preparation, the functionalized polybutadiene (e.g., Hypro™ 2800X95 HTB or Hypro™ 1300X9 CTBNX) was fed into Zone-3 of the extruder using a liquid pump. The reservoir and piping for the liquid was heat traced (about 60° C.) to ease the pumping efficiency.

Example 2—Characterization of Exemplary Polyolefin Blend Compositions

In this example, the physical and mechanical properties of the polyolefin blend compositions prepared according to the process described in Example 1 were characterized.

All of the physical and mechanical testing was performed according to ASTM standards. All tensile tests were measured with an ASTM D638 standard. Izod impact tests were measured accord to an ASTM D256 standard. The melt flow data were measured with an ASTM D1238 standard.

Example 2A—Characterization of Exemplary Polyolefin Blend Compositions Containing a Hydroxyl-Functionalized Polybutadiene The base polyolefin control sample used was TI8300. The polyolefin and peroxide control sample used was TI8300C extruded with about 150 ppm Trigonox® 101 peroxide (addition of 3 wt % T101-MB masterbatch). The functionalized polybutadiene used was the hydroxyl-functionalized polybutadiene, Hypro™ 2800X95 HTB. The tests were conducted on the polyolefin blend compositions incorporating 3, 6, and 9 wt % of the functionalized polybutadiene, respectively, along with the 150 ppm peroxide. The results are listed in Table 1.

TABLE 1

Composition and properties for the samples tested in Example 2A

| | Sample No. | | | | |
| --- | --- | --- | --- | --- | --- |
| | 1 | 2 | | | |
| | Base | Polyolefin + | | | |
| | polyolefin | peroxide | 6 | 7 | 8 |
| Blend ingredients | control | control | | Tests | |
| Composition (wt % for each ingredient) | | | | | |
| Polypropylene (TI8300) | 100 | 97 | 94 | 91 | 87 |
| Organic peroxide (T101-MB) | 0 | 3 | 3 | 3 | 3 |
| Functionalized polybutadiene (Hypro™ 2800X95 HTB) | 0 | 0 | 3 | 6 | 10 |
| Total (wt %) | 100 | 100 | 100 | 100 | 100 |
| Property | | | | | |
| MFI (dg/min) | 27 | 44 | 34 | 40 | 55 |
| Izod @ 0 °C. (ft-lb/inch) | 2.0 | 1.8 | 1.8 | 2.2 | 2.0 |
| Izod @ −20 °C. (ft-lb/inch) | 0.8 | 0.9 | 0.5 | 0.4 | 0.6 |
| Izod @ −30 °C. (ft-lb/inch) | 0.5 | 0.4 | 0.4 | 0.4 | 0.4 |
| Tensile Modulus (psi) | 127,546 | 126,727 | 91,401 | 88,289 | 86,754 |
| Tensile Yield Stress (psi) | 2616 | 2726 | 2438 | 2355 | 2265 |
| Tensile Yield Strain (%) | 6.9 | 7.7 | 10.5 | 10.4 | 9.4 |
| Tensile Break Stress (psi) | 2109 | 1998 | max - upper limit on extension | | |
| Tensile Break Strain (%) | 249 | 117 | max - upper limit on extension | | |
| Eta* @ 0.1 rad/s (Pa · s) | 1631 | 755 | 1339 | 1525 | 1649 |
| G' @ 0.1 rad/s | 27 | 8 | 23 | 31 | 42 |
| tan D @ 0.1 rad/s | 6.0 | 9.8 | 5.6 | 4.8 | 3.8 |

As shown in Table 1, a systematic increase in melt flow was observed with the increased amounts of the functionalized polybutadiene in the polyolefin blend composition, without a reduction in the impact toughness (Izod) measured at 0, −20, and −30° C. The tensile break stress and tensile break strain were both much higher than those of the polyolefin+peroxide control sample (Sample No. 2) and the base polyolefin control sample (Sample No. 1).

Figure 1A:
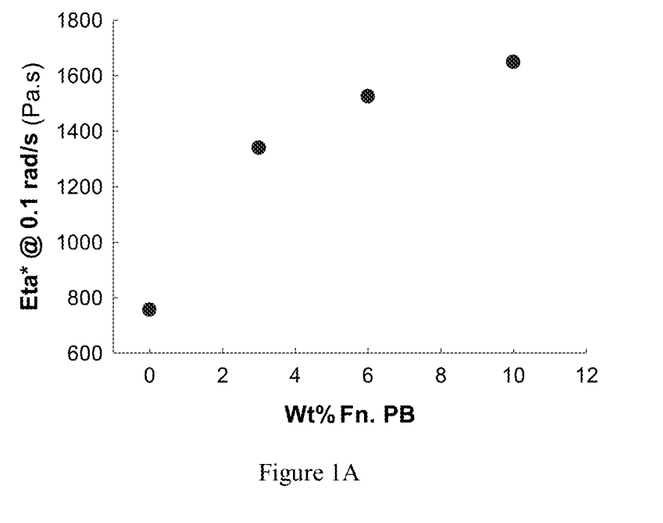
FIGS. 1A-1B show the results of the low-frequency melt viscosity (Eta* @ 0.1 rad/s) (FIG. 1A) and melt low-frequency elasticity (G' @ 0.1 rad/s) (FIG. 1B) for the exemplary polyolefin blend composition containing a polypropylene base polymer, an organic peroxide, and various amounts of a hydroxyl-functionalized polybutadiene (Fn. PB) (Sample Nos. 2 and 6-8 listed in Table 1).
Figure 1B:
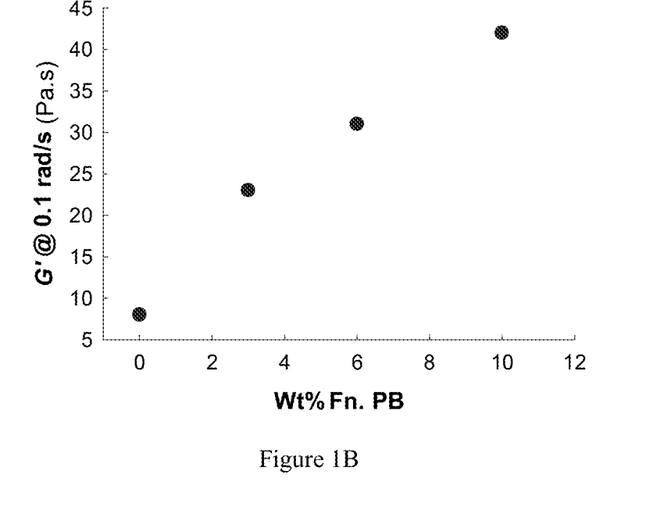

Additionally, as also shown in FIGS. 1A-1B, the low-frequency melt viscosity (Eta* @ 0.1 rad/s) and low-frequency melt elasticity (G' @ 0.1 rad/s) increased systematically with the increased amounts of the functionalized polybutadiene (Fn. PB) in the polyolefin blend composition. These results are surprising, as the hydroxyl-functionalized polybutadiene (Hypro™ 2800X95 HTB) that was used is a liquid at room temperature and its viscosity at room temperature is only 5 Pa·s.

Example 2B—Characterization of Exemplary Polyolefin Blend Compositions Containing a Hydroxyl-Functionalized Polybutadiene The base polyolefin control sample used was F2700HC. The polyolefin and peroxide control samples were used in comparative examples, in which F2700HC was extruded with increased amounts of Trigonox® 101 peroxide (addition of 3, 6, and 9 wt % T101-MB masterbatch, respectively). The functionalized polybutadiene used was the hydroxyl-functionalized polybutadiene, Hypro™ 2800X95 HTB. The tests were conducted on the polyolefin blend compositions incorporating 3, 6, and 9 wt % of the functionalized polybutadiene, respectively. The results are listed in Table 2.

Figure 2A:
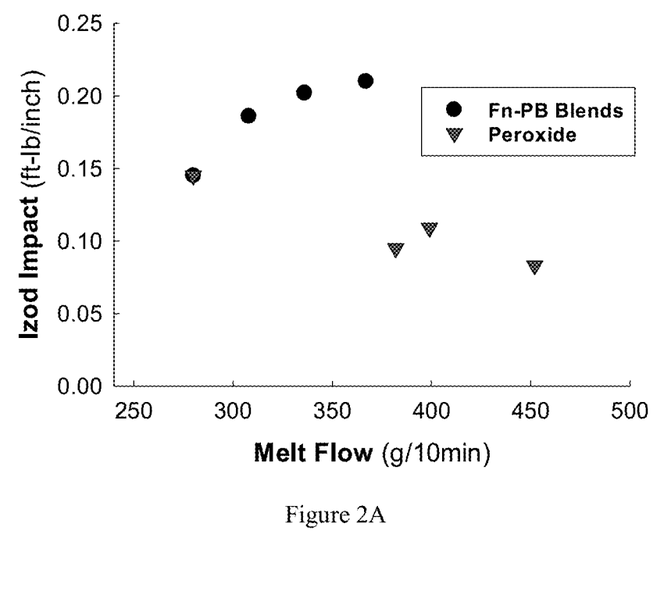
FIGS. 2A-2C show the results of the impact toughness (Izod measured at room temperature) (FIG. 2A), tensile yield stress (FIG. 2B), and tensile break stress (or ultimate strength) (FIG. 2C) plotted against the results of the melt flow index for (a) the exemplary polyolefin blend composition containing a polypropylene base polymer and various amounts of a hydroxyl-functionalized polybutadiene (Fn. PB Blends) (Sample Nos. 1-4 listed in Table 2); and (b) the control samples containing a blend of polypropylene base polymer with various amounts of an organic peroxide (Peroxide) (Sample Nos. 1 and 5-7 listed in Table 2).
Figure 2B:
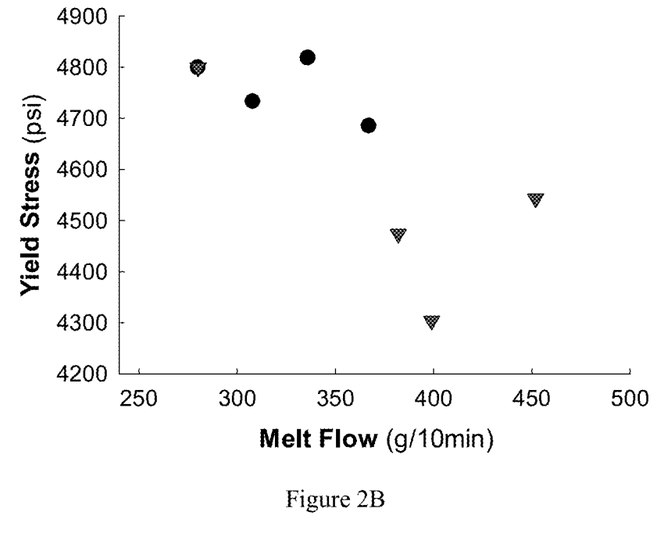

(Izod measured at room temperature) (FIG. 2A), tensile yield stress (FIG. 2B), and tensile break stress (or ultimate strength) (FIG. 2C) were plotted against the results of the melt flow index for (a) the exemplary polyolefin blend composition containing a polypropylene base polymer and various amounts of a hydroxyl-functionalized polybutadiene (Fn. PB Blends) (Sample Nos. 1-4 listed in Table 2) and (b) the control samples containing a blend of polypropylene base polymer with various amounts of an organic peroxide (Peroxide) (Sample Nos. 1 and 5-7 listed in Table 2).

Figure 2C:
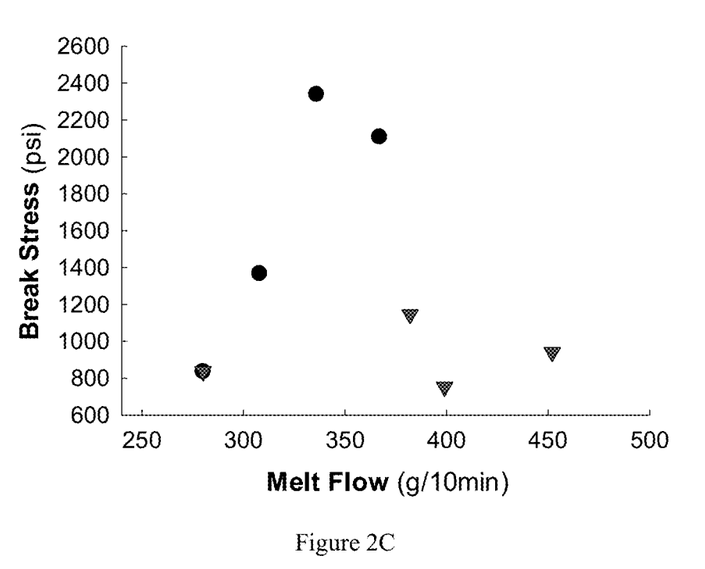

For the control samples blending the organic peroxide with the polypropylene base polymer (Sample Nos. 5-7), although an increased amounts of the organic peroxide resulted in an increased melt flow, this increased melt flow was accompanied by a decrease in the impact toughness (FIG. 2A), tensile yield stress (FIG. 2B), and tensile break stress (or ultimate strength) (FIG. 2C). Surprisingly, when blending the polypropylene base polymer with a hydroxyl-functionalized polybutadiene (Sample Nos. 2-4), the increased amounts of hydroxyl-functionalized polybutadiene not only resulted in an increased melt flow, but also resulted in an increase in the impact toughness (FIG. 2A), tensile yield stress (FIG. 2B), and tensile break stress (or ultimate strength) (FIG. 2C).

Example 2C—Characterization of Exemplary Polyolefin Blend Compositions Containing a Hydroxyl-Functionalized Polybutadiene The base polyolefin control sample used was TI8300. The polyolefin and impact modifier control sample were used in comparative examples, in which TI8300 was extruded with the increased amounts (5 and 10 wt %, respectively) of an impact modifier (ENGAGE™ 7467 or Vistamaxx™ 6202fl).

TABLE 2

Composition and properties for the samples tested in Example 2B

| | Sample No. | | | | | | |
|---|---|---|---|---|---|---|---|
| Blend ingredients | 1 Base polyolefin control | 2 | 3 Tests | 4 | 5 | 6 Polyolefin + increasing levels of peroxide control | 7 |
| Composition (wt % for each ingredient) | | | | | | | |
| Polypropylene (F2700HC) | 100 | 97 | 94 | 91 | 97 | 94 | 91 |
| Organic peroxide (T101-MB) | 0 | 0 | 0 | 0 | 3 | 6 | 9 |
| Functionalized polybutadiene (Hypro™ 2800X95 HTB) | 0 | 3 | 6 | 9 | 0 | 0 | 0 |
| Total (wt %) | 100 | 100 | 100 | 100 | 100 | 100 | 100 |
| Property | | | | | | | |
| MFI (dg/min) | 280 | 308 | 336 | 367 | 399 | 452 | 382 |
| Izod @ RT (ft-lb/inch) | 0.15 | 0.19 | 0.20 | 0.21 | 0.11 | 0.08 | 0.10 |
| Tensile Modulus (psi) | 357720 | 327695 | 320723 | 322571 | 388374 | 344383 | 341238 |
| Tensile Yield Stress (psi) | 4799 | 4733 | 4818 | 4685 | 4304 | 4543 | 4474 |
| Tensile Yield Strain (%) | 2.1 | 2.6 | 3.8 | 3.4 | 1.7 | 2 | 2 |
| Tensile Break Stress (psi) | 836 | 1367 | 2339 | 2108 | 752 | 941 | 1146 |
| Tensile Break Strain (%) | 2 | 3 | 4 | 4 | 2 | 2 | 2 |

As shown in Table 2, blending polypropylene polymer with a functionalized polybutadiene presented considerable advantages over blending with an organic peroxide to increase the melt flow. These advantages are also reflected in FIGS. 2A-2C in which the results of the impact toughness The functionalized polybutadiene used was the hydroxyl-functionalized polybutadiene, Hypro™ 2800X95 HTB. The tests were conducted on the polyolefin blend compositions incorporating 3, 6, and 9 wt % of the functionalized polybutadiene, respectively. The results are listed in Table 3.

TABLE 3

Composition and properties for the samples tested in Example 2C

| Blend ingredients | 1 Base polyolefin control | 2 | 3 | 4 | 5 | 6 | 7 | 8 | |
|---|---|---|---|---|---|---|---|---|---|
| | | Polyolefin + impact modifier control | | | | | Tests | | |
| Composition (wt % for each ingredient) | | | | | | | | | |
| Polypropylene (TI8300C) | 100 | 95 | 90 | 95 | 90 | 97 | 94 | 91 | |
| Impact modifier (ENGAGE ™ 7467) | 0 | 5 | 10 | 0 | 0 | 0 | 0 | 0 | |
| Impact modifier (Vistamaxx ™ 6202fl) | 0 | 0 | 0 | 5 | 10 | 0 | 0 | 0 | |
| Functionalized polybutadiene (Hypro ™ 2800X95 HTB) | 0 | 0 | 0 | 0 | 0 | 3 | 6 | 9 | |
| Total (wt %) | 100 | 100 | 100 | 100 | 100 | 100 | 100 | 100 | |
| Property | | | | | | | | | |
| MFI (dg/min) | 29 | 24.9 | 22.9 | 26.6 | 24.1 | 30.6 | 37.2 | 49.5 | |
| Izod @ RT (ft-lb/inch) | 11.3 | 12.1 | 12.2 | 12.0 | 12.3 | 12.2 | 12.3 | 11.9 | All non-break |
| Izod @ −20° C. (ft-lb/inch) | 1.0 | 1.2 | 1.5 | 0.9 | 0.8 | 1.0 | 1.1 | 0.9 | All complete breaks |
| Izod @ −30° C. (ft-lb/inch) | 0.4 | 0.4 | 0.5 | 0.4 | 0.3 | 0.4 | 0.5 | 0.6 | |
| Tensile Modulus (psi) | 133549 | 118408 | 107115 | 110953 | 84306 | 118112 | 113621 | 112212 | |
| Tensile Yield Stress (psi) | 2688 | 2467 | 2285 | 2591 | 2300 | 2441 | 2304 | 2261 | |
| Tensile Yield Strain (%) | 6.7 | 7.4 | 8.2 | 8.3 | 11.6 | 7.4 | 7.4 | 7.5 | |
| TensileBreak Stress (psi) | 2125 | 2140 | 2118 | 2186 | 2057 | 2182 | 1802 | 2148 | |
| TensileBreak Strain (%) | 255 | 321 | 318 | 353 | 383 | 324 | 338 | 348 | |

As shown in Table 3, blending polypropylene polymer with a functionalized polybutadiene presented considerable advantages over blending with an impact modifier to increase the impact toughness. These advantages are also reflected in FIGS. 3A-3B in which the results of the melt flow index (FIG. 3A) and impact toughness (Izod measured at −30° C.) (FIG. 3B) for (a) the exemplary polyolefin blend composition containing a polypropylene base polymer and various amounts of a hydroxyl-functionalized polybutadiene (Fn. PB) (Sample Nos. 1 and 6-8 listed in Table 3) and (b) the control samples containing a blend of polypropylene base polymer with various amounts of an impact modifier ENGAGE™ 7467 (Engage; Sample Nos. 1-3 listed in Table 3) or Vistamaxx™ 6202fl (Vistamaxx; Sample Nos. 1 and 4-5 listed in Table 3).

For the control samples blending the industry standard impact modifiers (ENGAGE™ 7467 and Vistamaxx™ 6202fl) with the polypropylene base polymer (Sample Nos. 2-5), the melt flow of the blend decreased, as compared to that of the base polyolefin control (Sample No. 1). This is counter to what the automotive industry often looks for, for instance, where there is a strong demand for a high impact strength product that also exhibits high melt flow, as a higher melt flow enables the material reduction (downgaging) through thinner parts. This makes the traditional impact modifiers, such as ENGAGE™ 7467 and Vistamaxx™ 6202fl, less desirable for the applications that need both high melt flow and high impact.

Figure 3A:
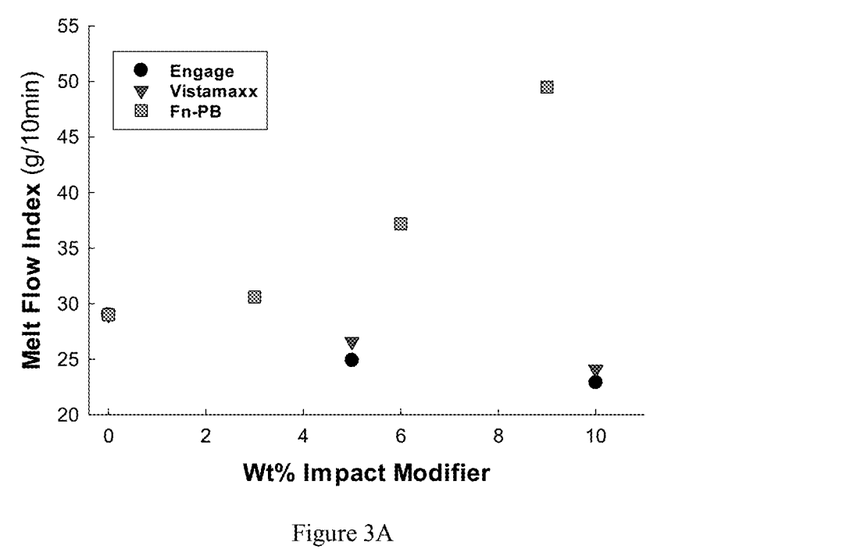
FIGS. 3A-3B show the results of the melt flow index (FIG. 3A) and impact toughness (Izod measured at −30° C.) (FIG. 3B) for (a) the exemplary polyolefin blend composition containing a polypropylene base polymer and various amounts of a hydroxyl-functionalized polybutadiene (Fn. PB; Sample Nos. 1 and 6-8 listed in Table 3); and (b) the control samples containing a blend of polypropylene base polymer with various amounts of an impact modifier ENGAGE™ 7467 (Engage; Sample Nos. 1-3 listed in Table 3) or Vistamaxx™ 6202fl (Vistamaxx; Sample Nos. 1 and 4-5 listed in Table 3).
Figure 3B:
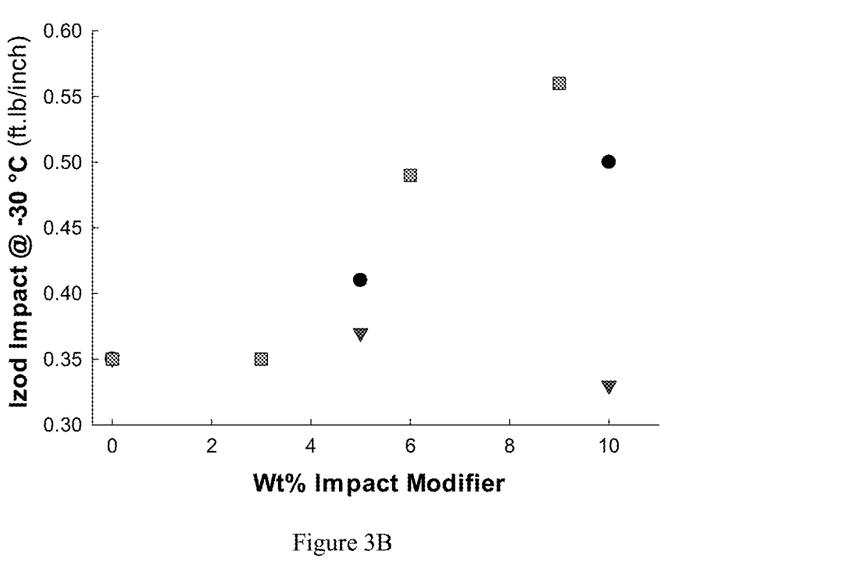

Using a hydroxyl-functionalized polybutadiene in a polyolefin blend composition not only provided an impact modification that was comparable or even superior to that provided by using a traditional impact modifier ENGAGE™ 7467 or Vistamaxx™ 6202fl (FIG. 3B), but at the same time provided an increase in melt flow. This is a significant advantage over the traditional impact modifier ENGAGE™ 7467 or Vistamaxx™ 6202fl (FIG. 3A).

Example 2D—Characterization of Exemplary Polyolefin Blend Compositions Containing a Hydroxyl-Functionalized Polybutadiene The base polyolefin control sample used was TI2350C. TI2350 can be used for mitigating tiger marking in long flow path injection molding applications, such as in automotive bumpers, due to the combination of high melt flow and high melt elasticity (as measured by G', for instance).

The functionalized polybutadiene used was the hydroxyl-functionalized polybutadiene, Hypro™ 2800X95 HTB. The tests were conducted on the polyolefin blend compositions incorporating 3, 6, and 9 wt % of the functionalized polybutadiene, respectively. The results are listed in Table 4.

TABLE 4

Composition and properties for the samples tested in Example 2D

| Blend ingredients | Sample No. | | | |
|---|---|---|---|---|
| | 8 Base polyolefin control | 9 | 10 Tests | 11 |
| Composition (wt % for each ingredient) | | | | |
| Polypropylene (TI2350C) | 100 | 97 | 94 | 91 |
| Functionalized polybutadiene (Hypro ™ 2800X95 HTB) | 0 | 3 | 6 | 9 |
| Total (wt %) | 100 | 100 | 100 | 100 |
| Property | | | | |
| MFI (dg/min) | 41 | 47.5 | 60 | 72 |
| Eta* @ 0.1 rad/s (Pa · s) | 555 | 656 | 679 | 730 |
| G' @ 0.1 rad/s | 5 | 10 | 13 | 16 |
| tan D @ 0.1 rad/s | 11.60 | 6.30 | 5.10 | 4.34 |
| Elasticity (G'/ω · Eta*) | 0.09 | 0.15 | 0.19 | 0.22 |

As shown in Table 4, blending the functionalized polybutadiene with polypropylene polymer (Sample Nos. 9-11) resulted in a higher melt flow and an even higher melt elasticity, as compared to that of the base polyolefin control (Sample No. 8). A systematic increase in melt flow was observed with the increased amounts of the functionalized polybutadiene in the polyolefin blend composition, combined with a simultaneously (and surprisingly) systematic increase in low-frequency viscosity (Eta* @ 0.1 rad/s) and in melt elasticity (G' @ 0.1 rad/s).

As discussed above in Example 2A, these results are surprising, as the hydroxyl-functionalized polybutadiene (Hypro™ 2800X95 HTB) that was used is a liquid at room temperature and its viscosity at room temperature is only 5 Pa·s.

Example 2E—Characterization of Exemplary Polyolefin Blend Compositions Containing a Carboxyl-Functionalized Polybutadiene The base polyolefin control sample used was TI8300. The polyolefin and peroxide control sample used was TI8300C extruded with about 150 ppm Trigonox® 101 peroxide (addition of 3 wt % T101-MB masterbatch). The functionalized polybutadiene used was the carboxyl-functionalized butadiene-acrylonitrile copolymer, Hypro™ 1300X9 CTBNX. The tests were conducted on the polyolefin blend compositions incorporating 3, 6, and 10 wt % of the functionalized polybutadiene, respectively, along with the 150 ppm peroxide. The results are listed in Table 5.

TABLE 5

Composition and properties for the samples tested in Example 2E

| Blend ingredients | Sample No. | | | |
|---|---|---|---|---|
| | 2 Polyolefin + peroxide control | 3 | 4 Tests | 5 |
| Composition (wt % for each ingredient) | | | | |
| Polypropylene (TI8300) | 97 | 94 | 91 | 87 |
| Organic peroxide (T101-MB) | 3 | 3 | 3 | 3 |
| Functionalized polybutadiene (Hypro ™ 1300X9 CTBNX) | 0 | 3 | 6 | 10 |
| Total (wt %) | 100 | 100 | 100 | 100 |
| Property | | | | |
| MFI (dg/min) | 44 | 44 | 60 | 103 |
| Izod @ 0 °C. (ft-lb/inch) | 1.8 | 1.7 | 1.6 | 1.3 |
| Izod @ 30 °C. (ft-lb/inch) | 0.4 | 0.4 | 0.4 | 0.4 |
| Tensile Modulus (psi) | 126,727 | 117,078 | 115,833 | 102,462 |
| Tensile Yield Stress (psi) | 2726 | 2582 | 2491 | 2309 |
| TensileBreak Stress (psi) | 1998 | 1940 | 1834 | 1745 |
| TensileBreak Strain (%) | 117 | 136 | 116 | 180 |
| Eta* @ 0.1 rad/s (Pa · s) | 755 | 863 | 976 | 1106 |
| G' @ 0.1 rad/s | 8 | 11 | 14 | 21 |
| tan D @ 0.1 rad/s | 9.8 | 7.9 | 6.8 | 5.3 |

As shown in Table 5, a systematic increase in melt flow was observed with the increased amounts of the functionalized polybutadiene in the polyolefin blend composition, combined with a simultaneously (and surprisingly) systematic increase in low-frequency viscosity (Eta* @ 0.1 rad/s) and in melt elasticity (G' @ 0.1 rad/s).

What is claimed is:

1. A polyolefin blend composition comprising
   about 60 to about 99.5 wt % of a polypropylene base polymer; and
   about 0.5 to about 40 wt % of a polybutadiene functionalized with one or more functional groups selected from the group consisting of hydroxyl, amine, epoxy, vinyl, carboxyl, acrylate or methacrylate, and combinations thereof, wherein the polybutadiene does not contain styrene,
   wherein the composition exhibits both i) an increased melt flow, measured in accordance with ASTM D1238, and ii) an increased impact toughness, measured by Izod impact at room temperature in accordance with ASTM D256, and/or melt elasticity, measured by G' at 0.1 rad/s, as compared to the same composition without the functionalized polybutadiene.

2. The polyolefin blend composition of claim 1, wherein the functionalized polybutadiene is a liquid polymer at room temperature.

3. The polyolefin blend composition of claim 1, wherein the functionalized polybutadiene is a hydroxyl-functionalized polybutadiene or a carboxyl-functionalized polybutadiene.

4. The polyolefin blend composition of claim 3, wherein the functionalized polybutadiene is a hydroxyl-functionalized polybutadiene, and the composition exhibits an increased melt flow index of about 10% or more, measured in accordance with ASTM D1238, and an increased impact toughness of about 25% or more, measured by Izod impact at room temperature in accordance with ASTM D256.

5. The polyolefin blend composition of claim 3, wherein the functionalized polybutadiene is a hydroxyl-functionalized polybutadiene, and the composition exhibits an increased melt flow index of about 5% or more, measured in accordance with ASTM D1238, and an increased impact toughness of about 8% or more, measured by Izod impact at room temperature in accordance with ASTM D256.

6. The polyolefin blend composition of claim 3, wherein the functionalized polybutadiene is a hydroxyl-functionalized polybutadiene, and the composition exhibits an increased melt flow index of about 15% or more, measured in accordance with ASTM D1238, and an increased melt elasticity of about 100% or more, measured by G' at 0.1 rad/s.

7. The polyolefin blend composition of claim 3, wherein the polyolefin blend composition does not contain an organic peroxide.

8. The polyolefin blend composition of claim 3, further comprising an organic peroxide.

9. The polyolefin blend composition of claim 8, wherein the functionalized polybutadiene is a hydroxyl-functionalized polybutadiene, and the composition exhibits an increased melt flow index of about 25% or more, measured in accordance with ASTM D1238, and an increased impact toughness of about 10% or more, measured by Izod impact at 0° C. in accordance with ASTM D256.

10. The polyolefin blend composition of claim 8, wherein the functionalized polybutadiene is a hydroxyl-functionalized polybutadiene, and the composition has an increased melt flow index of about 25% or more, measured in accordance with ASTM D1238, and an increased melt elasticity of about 400% or more, measured by G' at 0.1 rad/s.

11. The polyolefin blend composition of claim 8, wherein the functionalized polybutadiene is a carboxyl-functionalized polybutadiene, and the composition exhibits an increased melt flow index of about 35% or more, measured in accordance with ASTM D1238, and an increased melt elasticity of about 75% or more, measured by G' at 0.1 rad/s.

12. The polyolefin blend composition of claim 1, wherein the content of the functionalized polybutadiene ranges from about 2 to about 10 wt %.

13. The polyolefin blend composition of claim 1, wherein the functionalized polybutadiene has an average functionality ranging from about 1 to about 5.

14. The polyolefin blend composition of claim 13, wherein the functionalized polybutadiene has an average functionality ranging from about 2 to about 3.

15. The polyolefin blend composition of claim 1, wherein the polybutadiene is a butadiene polymer, butadiene-acrylonitrile copolymer, or combinations thereof.

16. The polyolefin blend composition of claim 1, wherein the polypropylene base polymer is a polypropylene homopolymer, or copolymer prepared from polypropylene and one or more other olefin monomers.

17. The polyolefin blend composition of claim 16, wherein the polypropylene base polymer is a copolymer prepared from polypropylene and one or more monomers selected from the group consisting of ethylene; 1-butene; 2-butene; 1,3-butadiene; 1-pentene; 1,3-pentadiene; 1,4-pentadiene; 3-methyl-1-butene; 3-methyl-1,4-pentadiene; 3,3-dimethyl-1,4-pentadiene; 1-hexene; 1,3-hexadiene; 1,4-hexadiene; 1,5-hexadiene; 4-methyl-1-pentene; 3-methyl-1-pentene; 3-methyl-1,5-hexadiene; 3,4-dimethyl-1,5-hexadiene; 4,6-dimethyl-1-heptene; 1,3-heptadiene; 1,4-heptadiene; 1,5-heptadiene; 1,6-heptadiene; 1-octene; 1,3-octadiene; 1,4-octadiene; 1,5-octadiene; 1,6-octadiene; 1,7-octadiene; 1-decene; 1-undecene; 1-dodecene; 1-tetradecene; 1-hexadecene; 1-octadecene; 1-eicosene; and combinations thereof.

18. The polyolefin blend composition of claim 16, wherein the polypropylene base polymer is polypropylene homopolymer; a random polypropylene copolymer comprising a second olefin comonomer; a heterophasic polypropylene impact copolymer comprising a second olefin comonomer; or a polymer blend containing polyethylene and/or polypropylene and/or copolymer thereof.

19. The polyolefin blend composition of claim 1, wherein the polyolefin blend composition further comprises about 0.005 to about 5 wt % organic peroxide.

20. The polyolefin blend composition of claim 1, wherein the content of the polypropylene base polymer ranges from about 70 to about 99 wt %, and the content of the functionalized polybutadiene ranges from about 1 to about 30 wt %.

21. The polyolefin blend composition of claim 20, wherein the content of the polypropylene base polymer ranges from about 80 to about 99 wt %, and the content of the functionalized polybutadiene ranges from about 1 to about 20 wt %.

22. The polyolefin blend composition of claim 1, wherein the polypropylene base polymer is a crystalline polypropylene polymer.

* * * * *

UNITED STATES PATENT AND TRADEMARK OFFICE
CERTIFICATE OF CORRECTION

PATENT NO. : 11,518,871 B2
APPLICATION NO. : 16/692433
DATED : December 6, 2022
INVENTOR(S) : Rajendra K. Krishnaswamy It is certified that error appears in the above-identified patent and that said Letters Patent is hereby corrected as shown below:

On the Title Page

In the priority claim (item (63)), please delete "Continuation of application No. 62/772,335, filed on Nov. 28, 2018," and replace it with "Provisional application No. 62/772,335, filed November 28, 2018"

Signed and Sealed this
Fourteenth Day of February, 2023

Katherine Kelly Vidal
*Director of the United States Patent and Trademark Office*